(12) United States Patent
Svenle

(10) Patent No.: US 9,885,611 B2
(45) Date of Patent: Feb. 6, 2018

(54) SENSOR ARRANGEMENT AND USE OF SENSOR ARRANGEMENT

(71) Applicant: TETRA LAVAL HOLDINGS & FINANCE S.A., Pully (CH)

(72) Inventor: Martin Svenle, Broby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/302,804

(22) PCT Filed: Mar. 24, 2015

(86) PCT No.: PCT/EP2015/056172
§ 371 (c)(1),
(2) Date: Oct. 7, 2016

(87) PCT Pub. No.: WO2015/154985
PCT Pub. Date: Oct. 15, 2015

(65) Prior Publication Data
US 2017/0030774 A1 Feb. 2, 2017

(30) Foreign Application Priority Data
Apr. 11, 2014 (SE) ........................ 1450449

(51) Int. Cl.
*G01J 5/02* (2006.01)
*G01J 5/04* (2006.01)
(Continued)

(52) U.S. Cl.
CPC ............ *G01J 5/043* (2013.01); *B65B 55/103* (2013.01); *G01J 5/0022* (2013.01)

(58) Field of Classification Search
CPC .......... G01K 13/16; G01K 1/14; G01K 13/08; G01K 11/20; G01K 17/42
See application file for complete search history.

(56) References Cited

U.S. PATENT DOCUMENTS 3,183,718 A 5/1965 Schnedler
3,947,249 A 3/1976 Egger
(Continued)

FOREIGN PATENT DOCUMENTS

DE 197 47 655 A1 5/1999
GB 2235051 A 2/1991
(Continued)

OTHER PUBLICATIONS

International Search Report (PCT/ISA/210) dated May 21, 2015, by the European Patent Office as the International Searching Authority for International Application No. PCT/EP2015/056172.
(Continued)

*Primary Examiner* — Kiho Kim
(74) *Attorney, Agent, or Firm* — Young & Thompson

(57) ABSTRACT

A sensor arrangement for temperature measurement of a material comprises a roller device with a sheathing configured such that the material can be rolled upon the sheathing. The sheathing comprises a first circumferential portion and a second portion, wherein a thickness of the sheathing in the first circumferential portion is greater than a thickness of the sheathing in the second portion. A temperature sensor arranged in a cavity inside the sheathing in proximity of the second portion.

20 Claims, 4 Drawing Sheets

(51) Int. Cl.
*B65B 55/10* (2006.01)
*G01J 5/00* (2006.01)

(56) References Cited

U.S. PATENT DOCUMENTS

| | | | |
|---|---|---|---|
| 4,091,673 A | | 5/1978 | Tamura et al. |
| 4,356,714 A | * | 11/1982 | Quehen .................. B21B 38/02 72/11.7 |
| 4,888,155 A | | 12/1989 | Posey et al. |
| 5,079,817 A | * | 1/1992 | Anstotz .................. D21F 5/022 100/328 |
| 5,103,916 A | * | 4/1992 | McLelland .............. A62C 3/04 169/61 |
| 5,110,218 A | | 5/1992 | Aizawa et al. |
| 5,279,534 A | | 1/1994 | Burlion et al. |
| 5,301,000 A | * | 4/1994 | Heigl ................. G03G 15/2053 219/216 |
| 5,678,390 A | | 10/1997 | Pruett et al. |
| 6,442,915 B1 | | 9/2002 | Kurth et al. |
| 2011/0295540 A1 | | 12/2011 | Maekinen |
| 2015/0114290 A1 | | 4/2015 | Saitou et al. |

FOREIGN PATENT DOCUMENTS

| | | |
|---|---|---|
| JP | 2002-220144 A | 8/2002 |
| WO | WO 2014/002842 A1 | 1/2014 |

OTHER PUBLICATIONS

Written Opinion (PCT/ISA/237) dated May 21, 2015, by the European Patent Office as the International Searching Authority for International Application No. PCT/EP2015/056172.

Swedish Office Action dated Dec. 1, 2014 by the Swedish Patent Office in Swedish Application No. 1450449-2 (5 pages).

* cited by examiner

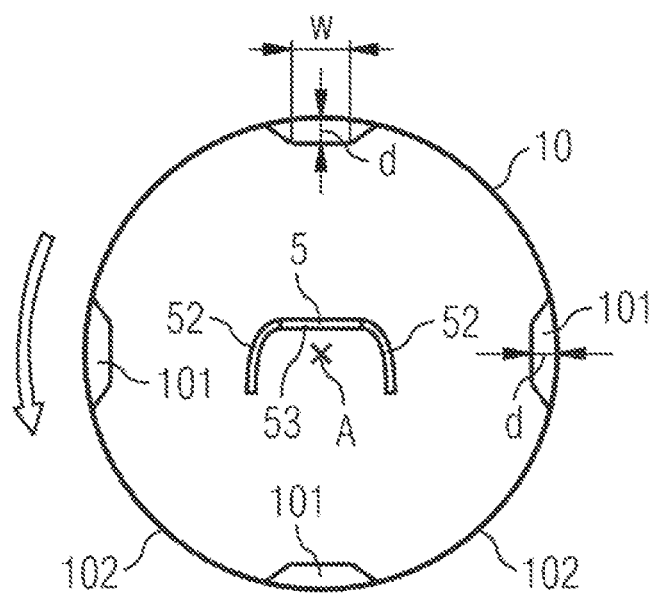

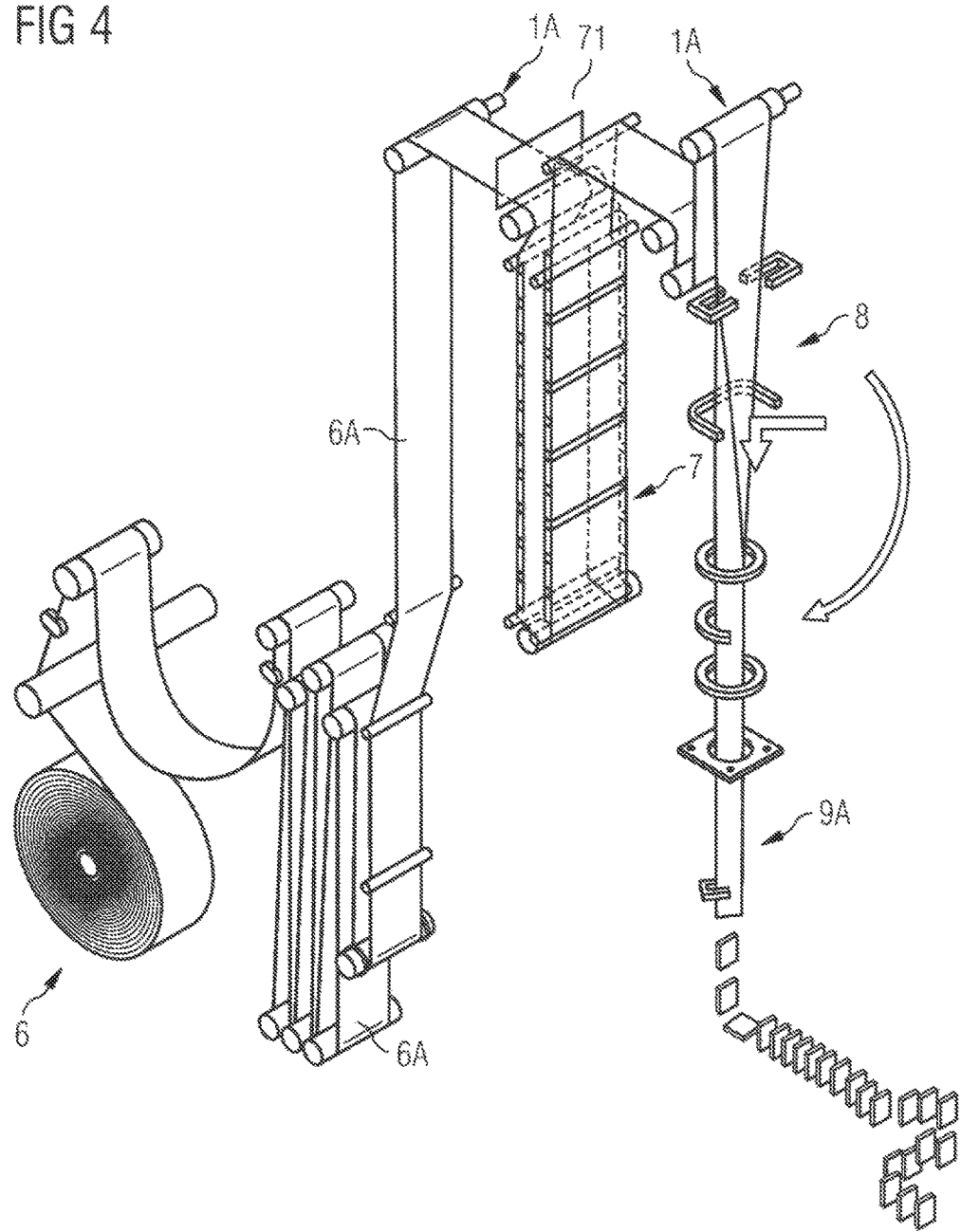

SENSOR ARRANGEMENT AND USE OF SENSOR ARRANGEMENT

The present invention relates to a sensor arrangement for temperature measurement of a material and to a use of such sensor arrangement

BACKGROUND OF THE INVENTION

Some applications request a temperature measurement for a material whose temperature shall be measured, as further or correct processing require certain temperature. For this purpose, a temperature sensor measuring the temperature of material can be in direct contact of the material. However, this is not always suitable, if the material is transported at high speeds, thereby causing mechanical stress on the sensor and the material itself. Small variations or fluctuation of the material positions at such high speeds may damage the sensor or leading to a shorter lifetime.

In other applications chemical agents are used and a sensor in contact with such agent may produce distorted signals.

Consequently there is a need of a sensor arrangement, which protects the senor form a hazardous environment while enabling reliable temperature measurements.

SUMMARY OF THE INVENTION

The present invention provides a sensor arrangement according to claim 1 and a use thereof according to independent claims 10 and 11. Further embodiment and aspects of the invention are subject to the dependant claims.

In one aspect of the invention the sensor arrangement comprises a device for a material to be rolled or transported upon. The device comprises a roller. The roller has a sheathing, thereby providing a cavity within the roller. The term sheathing may also comprise a hull or casing. The material can be transported upon the sheathing, hull or casing and is in direct contact with it. In an embodiment, a horizontal rotational axis extends through the sheathing. The sheathing comprises a first portion and a second portion which are arranged with their respective centers on the axis. In other words, the sheathing and the first and second portions rotate around the horizontal axis.

Inside the roller a temperature sensor is attached and configured to measure a radiation (representing a temperature) coming from the sheathing. The temperature sensor may be arranged on the horizontal axis.

Particularly, the second portion of the sheathing is in the proximity of the temperature sensor. In other words, a distance of the temperature sensor to the second portion is generally smaller than a distance from the temperature sensor to the first portion. This enables the sensor to particularly read the temperature of the second portion.

In accordance with the invention, the second portion of the sheathing comprises a thickness, which is smaller than a thickness of the first portion of the sheathing.

In other words, a thickness of the second portion is reduced compared to a thickness of the first portion.

The smaller thickness of the second portion provides a fast heat transfer from material whose temperature shall be measured through the sheathing material. As a result, the sensor has a fast response time if the temperature of the material upon the sheathing changes.

In addition, the sensor is rigidly arranged inside the cavity of the roller, while the roller itself may rotate with high frequency.

Thus, the sensor is protected from damages or wear-out phenomena due to a high rotation frequency of the roller. It does not get in contact with the fast moving material protecting, both the sensor and the material from being damaged. Further, the sheathing provides protection against dust or other particles as well as aggressive chemical agents used in such environment to treat the material.

In an embodiment of the invention, the second portion of the sheathing can be arranged generally in the middle of the sheathing and two first portions are adjacent to the second portion. In such embodiment, the second portion is symmetrically arranged with relation to the sheathing.

In an embodiment, the sheathing comprises in the second portion a material with a good heat conductivity so a uniform temperature is quickly reached throughout second portion. A good heat conductivity is also useful to support a fast response time, if the temperature of the material changes. The first portion may comprise the same material as the second portion. In an embodiment stainless steel is used for the sheathing. Stainless steel is a preferred choice in some applications related to material being in contact with food or other consumable products. However, copper or other material depending on the application and the material whose temperature is to be measured can be used as well.

In another embodiment, the material may also be transparent to IR radiation, which is useful in case of an IR radiation temperature sensor.

In an embodiment, the first portion comprises a first outer layer and at least a second inner layer, the latter layer being closer to the horizontal axis of the sheathing. The first layer may extend through the first portion and the second portion. The second portion therefore comprises the first outer layer. In such embodiment, a thickness of the second portion is generally smaller than a thickness of the first portion.

In another embodiment, the first portion is circumferential, hence rotationally symmetric around the horizontal axis. The symmetry supports high rotation frequency of the roller and the sheathing. The second portion may be circumferential around the horizontal axis of the sheathing. It is possible to produce the second portion by milling or grinding the inner surface of the sheathing to achieve the smaller thickness in the area of the second portion.

Alternatively, the second portion may comprises at least two rib portions arranged in parallel to the horizontal axis. Further, the two ribbons are arranged rotationally symmetric around said axis of the sheathing, thereby also forming at least two sub-portions adjacent to each rib. The at least two ribs comprise a greater thickness than the sub-portions adjacent to each of the at least two ribs.

The at least two ribs may connect two first portions to each other adjacent to the second portion. Further, the ribs act as a support structure for the areas adjacent to them. The thickness or the ribs can be equal or less to a thickness of the first portions and can comprise the same material as the first portions.

In a further embodiment, the sensor comprises a shielding that prevents undesired radiation from reaching the sensor and resulting in wrong readings. The shielding may surround at least partly the sensor or more particularly the temperature sensitive sensor head and act also as a radiation guide having one or more reflecting or mirroring areas, reflecting radiation (corresponding to temperature) towards the sensor.

In an embodiment, the temperature sensitive head of the sensor is arranged substantially parallel to the horizontal axis and the shielding is placed in front of the sensor head with some space in between. In such embodiment, the shielding prevents radiation from direction substantially parallel to the horizontal axis. Radiation with a portion perpendicular to the horizontal axis may be received by the sensor, said radiation coming from the first and second portion, respectively.

The shielding may contain an opening facing the second portion of the sheathing. Reflective areas on an inner surface of the shielding are provided to reflect radiation entering through the opening towards the temperature sensitive head of the sensor. Thereby, particularly radiation from the second portion reaches the sensor head, while radiation from other directions is reflected by the shielding, further improving the sensitivity of temperature measurement.

In an embodiment, the sensor may be placed on a proximal end of a non-rotating shaft arranged centrically along the horizontal axis of the sheathing and the roller. The shaft comprises and opening at the distal end providing feedthrough holes for current and signal connections to the sensor. The shaft is not in contact with the sheathing, but rigidly attached to a detachable flange. The sheathing, however, is pivot-mounted on said flange. In an embodiment the sheathing is pivot mounted between two flanges to provide sufficient stability at high rotation frequencies.

The sensor arrangement can be used to measure the temperature of paper or packaging material being rolled over the roller device and particularly the sheathing. Also the temperatures of plastics, laminates, foils or other materials rolled upon the roller can be measured. In an embodiment, the sensor head or the opening of the shielding faces a sub-portion of the second portion, which is in contact with the material rolled upon the sheathing. In other words, the sensor head or the opening of the shielding faces the material rolled upon the sheathing.

The sensor arrangement can be part of a filling machine for filling milk, juices or other beverages into carton based containers.

In another aspect of the invention, a filling machine for filling liquid into carton based packages comprises a packaging material magazine, a heating device for heating packaging material from the packaging material magazine to a certain temperature and a transport arrangement to supply packaging material from the magazine to certain stations within the filling machine for further processing. The filling machine comprises on or more sensor arrangement as described above.

In an embodiment, the transport arrangement comprises one or more sensor arrangement of the above type. Packaging material is transported by the transport arrangement to different stations. During the transport the packaging material is in contact with the sensor arrangement and particularly is rolled over the roller device and the sheathing, respectively.

The sensor arrangement can be part of a feedback loop in the filling machine, coupled to the heating device for heating packaging material to ensure a specific temperature of the packaging material. The feedback loop enables to achieve a stable temperature of the material for the purpose of sterilization the packaging material. For example, a stable temperature ensures that chemical residuals vaporize from the packaging material before the material is formed into a container and consumable liquid filled into.

DESCRIPTION OF THE DRAWING

The invention will become more apparent together with the accompanying drawings in which

FIG. 3 illustrates a cross section of a portion of a sensor arrangement according to the invention.

FIG. 4 illustrates a schematic embodiment of a filling machine.

DETAILED DESCRIPTION

FIG. 4 illustrates schematically a filling machine for filling consumable liquids into carton based packages. The term carton based packages include packages of any shape size of form having at least one fiber, pulp, paper or carton layer arranged between laminate layers. The packaging material can be supplied in form of a web or in blanks.

The filling machine comprises a packaging material magazine 6 for supplying packaging material 6A to a filling station 8 within the filling machine. Filling station 8 is arranged after a sterilization unit 7 to sterilize the packaging material before being filled with liquid.

The exemplary sterilization unit contains a bath of hydrogen-peroxide solution or a hydrogen-peroxide gas filled space. The packaging material to be sterilized is transported/moved through the bath or the gas filled space inside unit 7, respectively. The hydrogen-peroxide kills all germs and bacteria on the material, thereby sterilizing the packaging material. The sterilizing agent normally comprises a certain temperature higher than the normal room temperature to reduce condensation of the sterilization agent on the packaging material and also support vaporization of any residues on the packaging material. For this purpose, the packaging material is heated by a heating unit 71, preferably to a temperature equal or higher than the bath or hydrogen peroxide temperature.

The heating unit 71 is part of a feedback loop (not shown), the feedback loop also comprising one or more of sensor arrangements for temperature measurement of the packaging material. Any temperature deviation of the material is fed back to the heating device, so an optimal temperature of the material can be maintained.

In the schematic embodiments of FIG. 4, the filling machine comprises two sensor arrangements for temperature measurement. One is located prior to the sterilization unit 7 and the heating unit 71, another sensor is measuring the temperature of the packaging material after unit 7.

For that purpose often, an IR sensor is used, as this one enables to measure the temperature continuously. However, if the sensor is in direct contact with the material, i.e. sliding over the material, the high speed of the packaging material may cause damages and increased stress to the sensor. Consequently, the sensor will wore out faster and fail more quickly. But even without direct contact, the temperature sensor can be affected by the aggressive chemicals of the sterilization or dirt and other particles swirled around by the packaging material.

In the embodiment of the filling machine according to FIG. 4, two sensor arrangements 1A are provided enabling to measure the packaging material temperature at high transportation speed. The arrangements 1A protect the temperature sensor (being part of the arrangement) from chemical or mechanical stress resulting in a long lifetime while providing reliable measurements.

Figure 1:
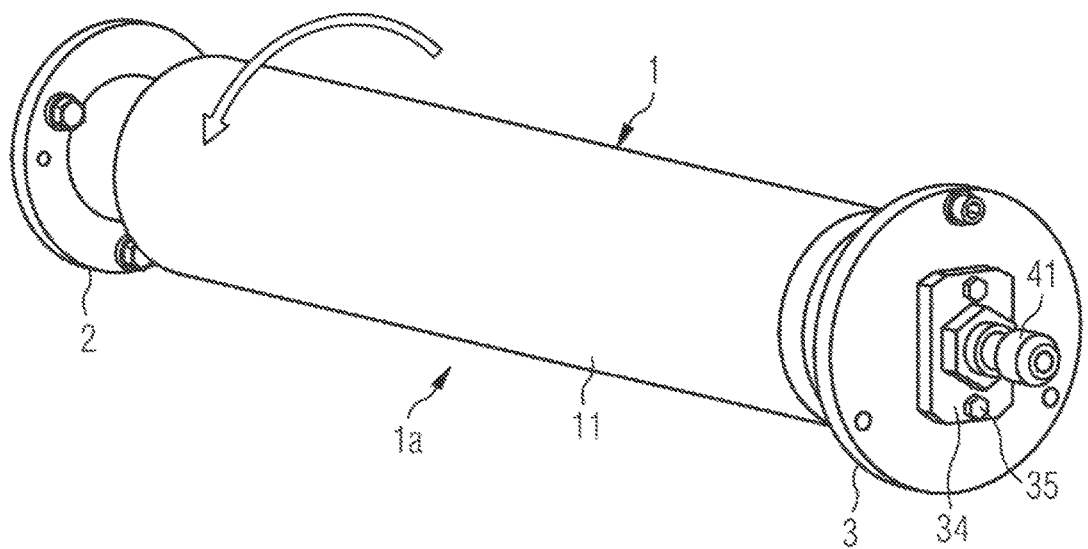
FIG. 1 illustrates a perspective view of an embodiment of a sensor arrangement according to the invention.

FIG. 1 illustrates an embodiment of such sensor arrangement 1A. Sensor arrangement 1A protects the sensible sensor from mechanical and or chemical stress, enabling the sensor to be used in more hazardous environments.

Sensor arrangement 1A comprises a roller device 1 having a sheathing 11, which is pivoted to a first flange 2 and a second flange 3. In other words, sheathing 11 is arranged centrically on a horizontal axis A, schematically illustrated in FIG. 2. The diameter of sheathing 11 is about 0.15 m. However, any other diameter suitable for the respective application can be used as well.

Referring back to FIG. 1, sheathing 11 comprises a material which provides a relatively high sliding friction for the material to be transported. Sheathing 11 is in contact of the material, whose temperature is to be measured. The contact allows for heat transfer from the material to the sheathing and vice versa, such that equilibrium is reached and an average temperature of the material can be measured.

The rotation of sheathing 11 transports the packaging material. The roller may also be used to bend and change the transport direction of the packaging material. In the embodiment of FIG. 4, the material is transported with about 0.4 to 1 m/s, e.g. at 0.545 m/s, which at a diameter of the sheathing of about 0.15 m results in a rotation frequency of roller 1 of about 2.1 Hz.

Second flange 3 comprises a fixation, mount or fastener 34 for an inner hollow signal cable shaft 43 (not shown), whose connector opening 41 protrudes from the fastener 34. The cable shaft 43 is rigidly attached to flange 3 by one or more fastening screws 35 connecting the fastener 34 to the flange 3.

Figure 2:
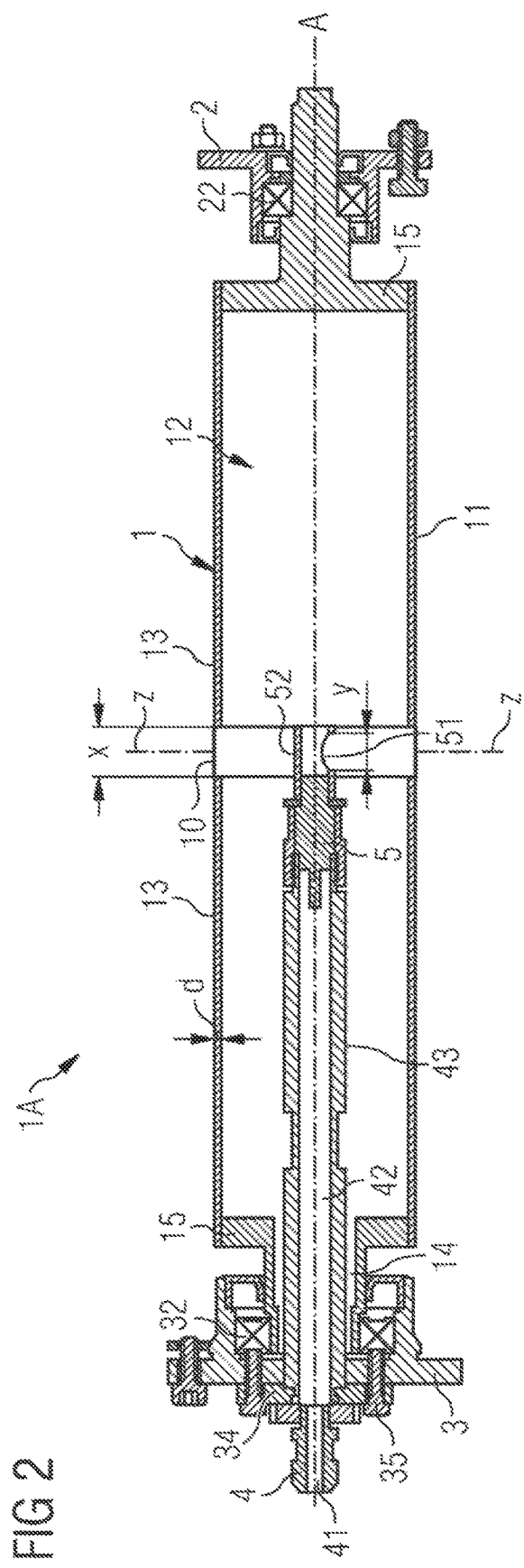
FIG. 2 shows a schematic sectional view of a sensor arrangement according to the invention.

Referring now to FIG. 2 illustrating a schematic sectional view of a sensor arrangement according to the invention. The sheathing 11 of the roller device 1 comprises to coupling portions 15. Coupling portions 15 are welded to sheathing 11. Sheathing 11 is pivoted via those portions 15 to two bearings 22, 32, arranged on flanges 2 and 3, respectively. Bearings 22, 32 and coupling portions 15 have a very low friction, so high rotational speeds can be achieved. Both bearing are protected against the chemical agent used in the specific application of FIG. 4. For this purpose, a seal made of a agent resistant material is attached in front of the bearing facing sheathing 11.

The diameter of coupling portion 15 in area 14, at which sheathing 11 is attached to the bearing is bigger than the hollow shaft 43 and about 25 mm. Consequently, shaft 43 and sheathing 11 of the roller device are not in contact. Hollow shaft 43 is rigidly attached to flange 3 and does not rotate in operation of the arrangement 1A. It is arranged centrically on horizontal axis A and extends parallel to said axis into the cavity 12 of roller device 1.

Sheathing 11 comprises substantially three portions or areas 10 and 13. Its respective outer surfaces are in contact with the packaging material. Portion 10 is arranged substantially in the middle of sheathing 11. Two portions 13 are with their respective proximal ends arranged adjacent to portion 10. In this embodiment, all areas 10 and 13 are circumferential, their respective thicknesses are uniform. This symmetry enables high rotations speeds without non-desired imbalances. The respective distal ends of areas 13 are welded to the coupling portions 15, which in return are coupled to the bearings 32 and 22, respectively. Sheathing 11 comprise stainless steel as this material is suitable for application in food processing and packaging.

The thickness d of portions 13 is greater than the thickness in portion 10 as illustrated in FIG. 2. The thickness of portion 10 is about 0.3 mm. The thickness of portions 13 can be 5 to 20 times higher than the thickness of portion 10, and for example in the range of 2 mm to 3 mm, particularly 2.5 mm.

During the manufacturing process of the roller device, portion 10 of sheathing is grinded or milled from the inside of the sheathing until the desired thickness is achieved. Then, coupling portions 15 are welded to the sheathing and the outside surfaces is treated to remove any protrusions or residuals from the welding process.

In an alternative embodiment, portion 13 may comprise several layers, for example an inner layer providing certain mechanical stability and an outer layer having a good heat conductivity. The outer layer actually extends over the whole sheathing 11, such that portion 10 contains the outer thinner layer.

The portion 10 with its reduced thickness has a smaller heat capacity than portion 13. This is suitable if the material used for portion 10 has relatively small heat conductivity. For instance heat conductivity of stainless steel is smaller than heat conductivity of copper, although steel is preferred in some food packaging applications. Therefore, small volumes with small heat capacities can still provide a good heat transfer. In equilibrium, any radiation, which is transmitted from portion 10 into cavity 12 of roller device 1 corresponds to a certain temperature of portion 10 and also of material being rolled over roller device 1 and sheathing 11.

Due to the small thickness and the reduced volume per area-unit of portion 10, portion 10 responds quickly to temperature changes. Such temperature changes will occur particularly, if packaging material with a different temperature is rolled over sheathing 11. Any different temperature between portion 10 and the packaging material results in a radiation change of portion 10 into the interior 12 of roller device 1. The radiation and any change of it can be captured by a respective sensor and converted to an absolute temperature or a temperature change.

For this purpose, an IR temperature sensor 5 is placed at the end of hollow shaft 43, placing the sensor approximately in the middle of roller device 1. One or more electric connection for supplying temperature sensor 5 and transmitting signals there from are fed through hollow shaft 43 and its cavity 42. Further, a cooling medium can be transported through the cavity to improve the sensibility of temperature measurements of sensor 5 when necessary. In this embodiment, portion 10 and adjacent sub-portion of portion 13 are treated in a way to emit radiation similar to the spectrum of black body radiation of the same temperature. To achieve this, portion 10 is painted black. Sub-portions in the range of 10% to 20% of width x of portions 10 are also painted black. Radiation emitted from black painted areas comprises a spectrum similar to black body radiation, which corresponds to a certain temperature.

Temperatures sensor 5 is measuring infrared radiation from the blackened areas. The respective sensor signal corresponds (assuming a prior calibration) to an absolute temperature and a signal change in particular to a temperature change. Due to the black paint on the measurement area, the sensor's sensitivity is improved.

In this embodiment, the temperature (or radiation) sensitive area of sensor 5 is arranged parallel to horizontal axis A, resulting in highest sensitivity of the sensor for undesired radiation substantially parallel to horizontal axis A. Such radiation distorts the temperature measurement. To reduce undesired radiation and improve the measurement, sensor 5 comprises a shielding 5 in front of the temperature measurement area, blocking radiation parallel to horizontal axis A. Shielding 52 comprises a window, aperture or opening 51 (hereafter just referred to as opening), which faces an inner surface of portion 10 of sheathing 11. The length or size y of opening 51 is slightly smaller than the length x of portion 10, thereby receiving radiation mainly from portion 10.

Hence, radiation from said portion is received through the opening. Inside shielding 52 one or more reflective planes (not shown) are provided reflecting radiation through opening 51 towards the sensate area of sensor 5. Alternatively, the shielding can be shaped in such way that its inner surface reflects radiation towards the measurement area. This radiation corresponds to the temperature of portion 10, which—due to the small thickness response quickly to any temperature change of packaging material on the outer surface of sheathing 11.

The opening 51 is facing not only portion 10 but also an area of portion 10, which is in contact with the material. In other words, when the material, whose temperature is to be measured, is rolled upon the roller device, An area of portion 10 is in contact with the material at a given point in time. The opening 51 is no facing this area of portion 10. In the exemplary embodiment of FIG. 2, the illustrated lower part of sheathing 11 is in contact with the material. Hence, opening 51 also faces the material.

FIG. 3 shows a cross-section of another embodiment of portion 10 of a sensor arrangement. The sensor 5 in this embodiment is arranged parallel to the horizontal axis A and slightly offset to the center. The temperature measurement area 53 of sensor 5 is facing towards the center. To increase sensitivity of sensor 5 two shielding plates 52 are arranged on both sides of sensor 5 covering temperature sensitive area 53 from radiation from the sides. In this embodiment, the sensor monitors an area of portion 10, directly in view of the sensor window (in extension of a line through axis A and sensor area 53.

Any material whose temperature is to be measured is in direct contact with an area of portion 10 facing the sensitive area 53. In some embodiment, the material is bended by appr 45 to 90 degree or even more up to about 200 degree around the roller, thereby in direct contact of the sheathing over a large area of the sheathing.

Portion 10 of the embodiment of FIG. 3 comprises several sub-portions 102 arranged symmetrically around axis A and separated by ribs 101. The ribs 101 are arranged parallel to the horizontal axis A and extending over the whole length x of portion 10 and connects adjacent areas 13 with each other. The ribs 101 are symmetrically arranged to prevent imbalance when rotating at high speeds. In this embodiment, four ribs 101 are arranged with an angle of approximately 90 degrees around the central axis A. However, two or three ribs 101 can be used as well, corresponding to a rotational symmetry around axis A of 180 and 120 degrees, respectively.

Ribs 101 provide certain stability for portion 10 and its width w should be smaller than the width of the adjacent sub-portions 102. The thickness d of ribs 101 is equal to the thickness of portions 13, but can also be slightly smaller. It is, however, greater than a thickness of sub-portions 102. The ribs 101 provide stability to the sub-portion 102, therefore its thickness can be further reduced. The very small thickness results in a small volume per area-unit, which response fast to any temperature changes of packaging material rolled over sheathing 11 of roller device 1.

The respective embodiment, particularly the sensor types, its shielding and their respective arrangements can be combined in many different ways. Other sensor types, working on different principles can be used. It is useful that the senor "sees" (i.e. receive radiation) only a small portion of the sheathing, thereby reducing undesired radiation. In other words, any aperture opening or window of the sensor or of a shielding placed in front of the sensor shall be small, so the sensor receives only radiation coming from a desired area. Alternatively, the sensor (or its sensitive area) might be placed as close as possible to the sheathing. A combination is applicable as well resulting in a sufficient sensitivity of the senor regarding temperature changes of the monitored area.

With the sensor arrangement according to the present invention, the temperature of any material rolled or transported across the roller device can be easily measured. It is suitable not only for carton or packaging material, but also for metal or pure plastic foils or combinations thereof. The arrangement of the temperature sensor within the roller device protects the sensor from aggressive chemical agents, dust or mechanical stress. Therefore, high transportation speeds of the material, whose temperature is to be measured, can be achieved.

The sensor arrangement can be used in a filling machine, but also in other devices, which require material to be transported causing stress on the sensor itself.

REFERENCE LIST 1A sensor arrangement
1 roller device
2 first flange
3 second flange
4 opening
5 sensor
6 packaging material magazine
7 sterilization unit
8 filling station
9 package forming and cutting
10 second portion
11 sheathing
12 cavity
13 first portion
14 cavity
15 coupling portion
22 bearing
32 bearing
34 fastener
35 fastening screws
41 connector opening
42 hollow shaft cavity
43 hollow shaft
51 opening, aperture
52 shielding
101 ribs
102 sub-portion
A horizontal axis

The invention claimed is:

1. Sensor arrangement for temperature measurement of a material comprising:
   a hollow roller device with a sheathing configured to permit the material to be rolled upon the sheathing;
   wherein the sheathing comprises a first circumferential portion and a second portion, wherein a thickness of the sheathing in the first circumferential portion is greater than a thickness of the sheathing in the second portion;
   a temperature sensor arranged in a cavity inside the sheathing in proximity of the second portion.

2. The sensor arrangement according to claim 1, further comprising:
   a detachable flange to which the sheathing is pivoted to;
   a hollow shaft arranged along an horizontal axis of the hollow device, with a distal end coupled to the detachable flange and a proximal end inside the sheathing to which the temperature sensor is attached to.

3. The sensor arrangement according to claim 2, wherein the detachable flange comprises a pivot bearing.

4. The sensor arrangement according to claim 2, wherein the hollow shaft comprises a connector at the distal end for feeding a signal connection the temperature sensor.

5. The sensor arrangement according to claim 1, wherein the second portion is circumferential around a horizontal axis of the sheathing.

6. The sensor arrangement according to claim 1, wherein the second portion comprises at least two rib portions arranged rotationally symmetric around a horizontal axis of the sheathing and parallel to said axis, wherein the at least two ribs comprise a greater thickness than a sub-portion of the second portion between the at least two ribs.

7. The sensor arrangement according to claim 1, wherein the second portion or sub-portions thereof comprises a thickness in the range between 0.15 mm to 1 mm and particularly between 0.2 mm and 0.8 mm.

8. The sensor arrangement according to claim 1, wherein the temperature sensor comprises an opening for temperature radiation measurement, particularly IR radiation measurement, the opening facing the second portion of the sheathing.

9. The sensor arrangement according to claim 1, wherein the temperature sensor comprises a radiation shielding element with an aperture facing the second portion of the sheathing.

10. The sensor arrangement according to claim 9, wherein the shielding comprises at least one reflective portion as to direct radiation through the aperture towards the sensor.

11. The sensor arrangement according to claim 9, wherein the shielding is suited to prevent radiation substantially parallel to a horizontal axis from reaching the sensor.

12. The sensor arrangement according to claim 9, wherein the aperture size is smaller than a width of the second portion.

13. The sensor arrangement of claim 1, wherein a surface of the second portion facing the sensor is treated to emit radiation with a spectrum similar to black body spectrum of the same temperature.

14. The sensor arrangement of claim 1, wherein a surface of the second portion facing the sensor is blackened.

15. The sensor arrangement according to claim 1, wherein the sensor is adapted to receive a signal representing a temperature from an area of the second portion, which is on its outside covered by the material rolled upon.

16. The sensor arrangement according to claim 1, wherein the material, whose temperature is to be measured, is carton based material.

17. The sensor arrangement according to claim 16, wherein the carton based material is a web based packaging material.

18. Filling machine comprising:
at least a sensor arrangement according to claim 1;
a sterilization unit for sterilizing packaging material;
a packaging material magazine for providing packaging material to the sterilization unit; and
a filling station for filling liquid into a package structure formed from the packaging material, wherein the sensor arrangement is arranged before the filling station to measure the temperature of packaging material.

19. Filling machine of claim 18 further comprising:
a heating unit arranged prior to the sterilization unit for heating the packaging material, and
wherein the temperature sensor is coupled to the heating unit to provide a control signal for the heating unit based on the measured temperature.

20. Method for manufacturing a sensor arrangement, comprising:
providing a sheathing possessing a thickness;
treating a portion of an inner surface of the sheathing to reduce the its thickness of the sheathing;
welding a coupling portion to the sheathing;
attaching the sheathing with the coupling portion to a bearing of a detachable flange;
providing a hollow shaft having a temperature sensor at its proximal end, the hollow shaft also possessing a distal end; and
attaching the distal end of the hollow shaft to the detachable flange, such that the temperature sensor extends into the interior of the sheathing in proximity to the portion of the reduced thickness.

* * * * *